United States Patent [19]

Humphrey

[11] 3,711,178
[45] Jan. 16, 1973

[54] MIRROR STABILIZER HAVING SPACE REFERENCED MOTION

[75] Inventor: William E. Humphrey, Berkeley, Calif.

[73] Assignee: Optical Research and Development Corporation, Oakland, Calif.

[22] Filed: Sept. 28, 1970

[21] Appl. No.: 75,965

[52] U.S. Cl..................... 350/16, 33/204 D, 356/148
[51] Int. Cl. ............................................. G02b 23/02
[58] Field of Search ........ 350/16; 356/148, 149, 248, 356/250; 33/204 D, 223

[56] References Cited

UNITED STATES PATENTS

| 2,153,565 | 4/1939 | Isaacson | 33/223 |
| 2,903,798 | 9/1959 | Taylor | 33/223 X |
| 2,944,783 | 7/1960 | Macleish et al | 350/16 X |
| 3,460,881 | 8/1969 | Heflinger | 350/16 |

Primary Examiner—David Schonberg
Assistant Examiner—John W. Leonard
Attorney—Townsend and Townsend

[57] ABSTRACT

A mirror is neutrally supported in and biased in alignment with a window in a fluid filled chamber. The fluid, acting on both the sidewalls of the chamber and the surfaces of the mirror, causes the mirror to undergo proportional angular motion with respect to an inertial reference system when the chamber is subjected to vibrational angular motion with respect to the reference system. Placement of the mirror stabilizer at preselected points along the optical path of an optical instrument having high magnification is disclosed for producing instrument image stabilization.

13 Claims, 7 Drawing Figures

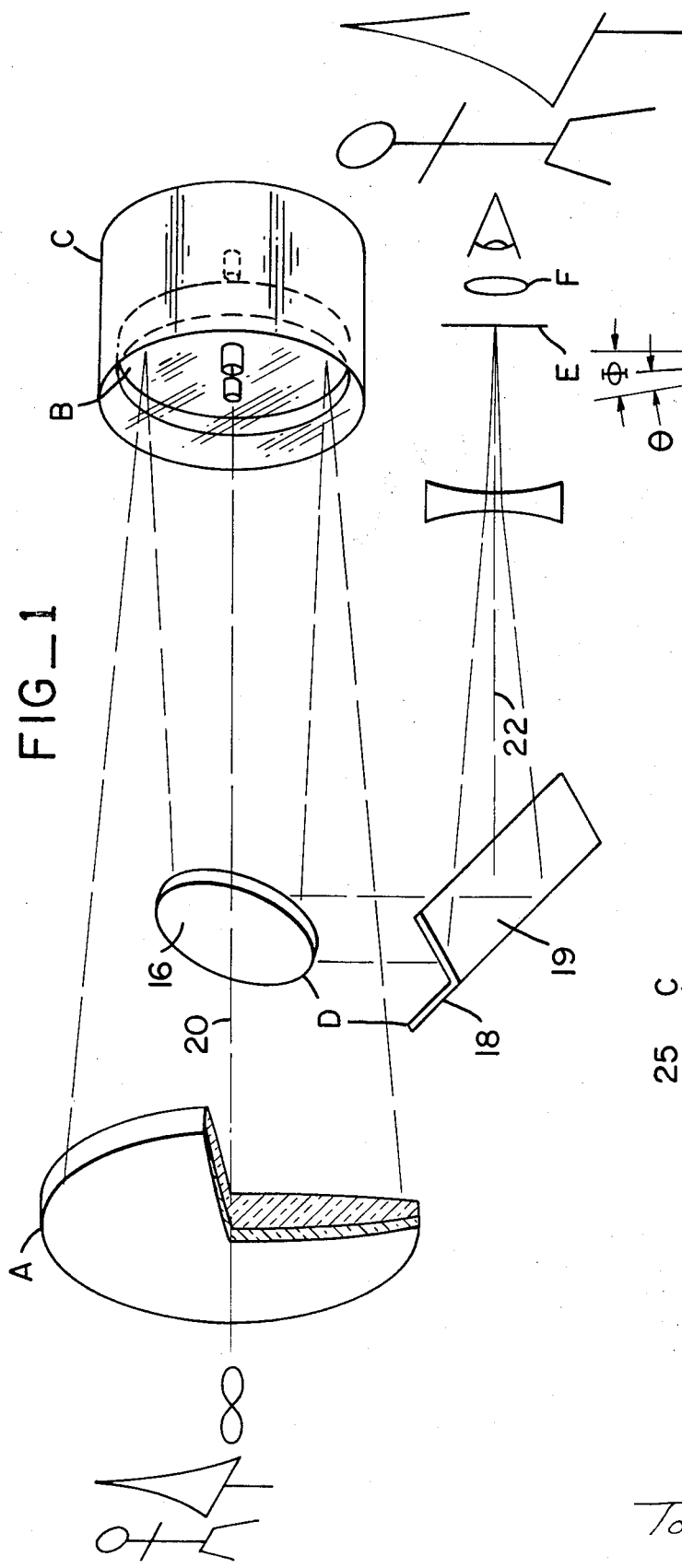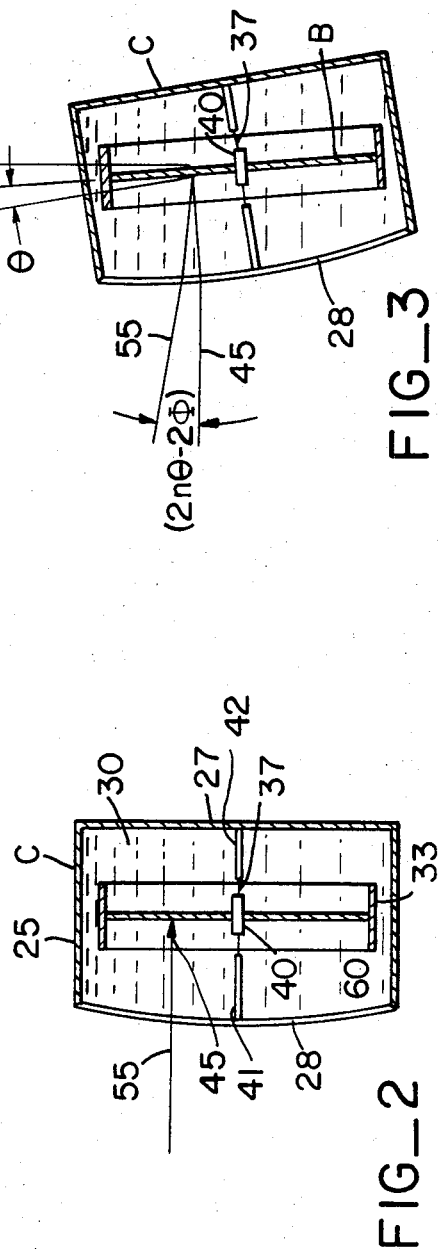

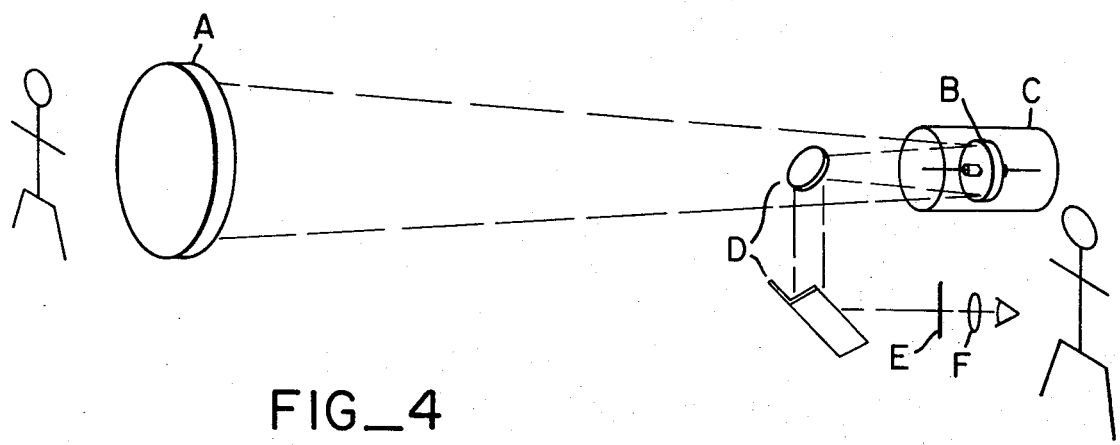
FIG_4
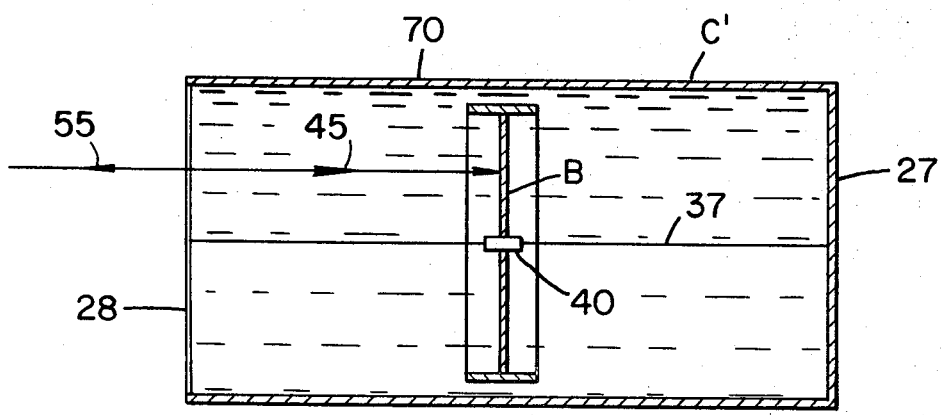
FIG_5
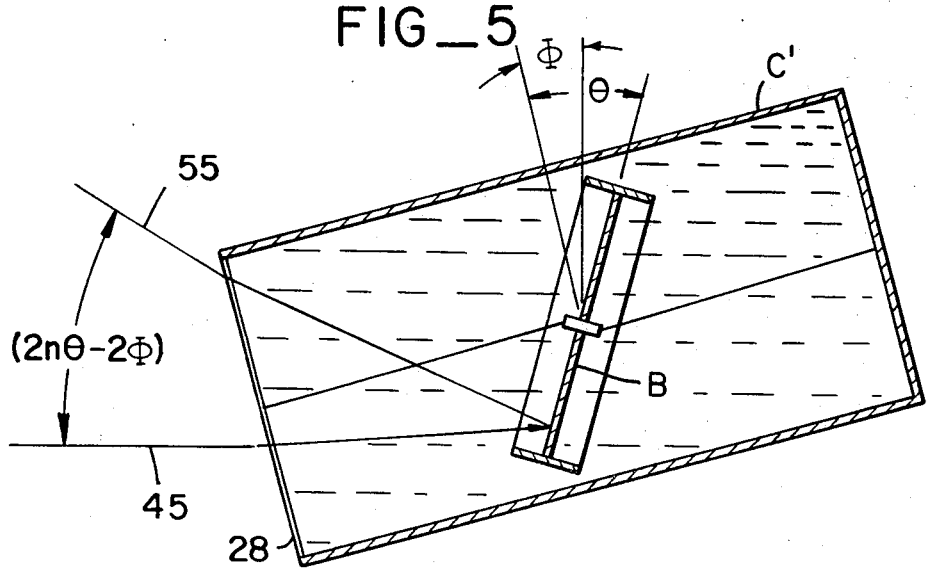
FIG_6

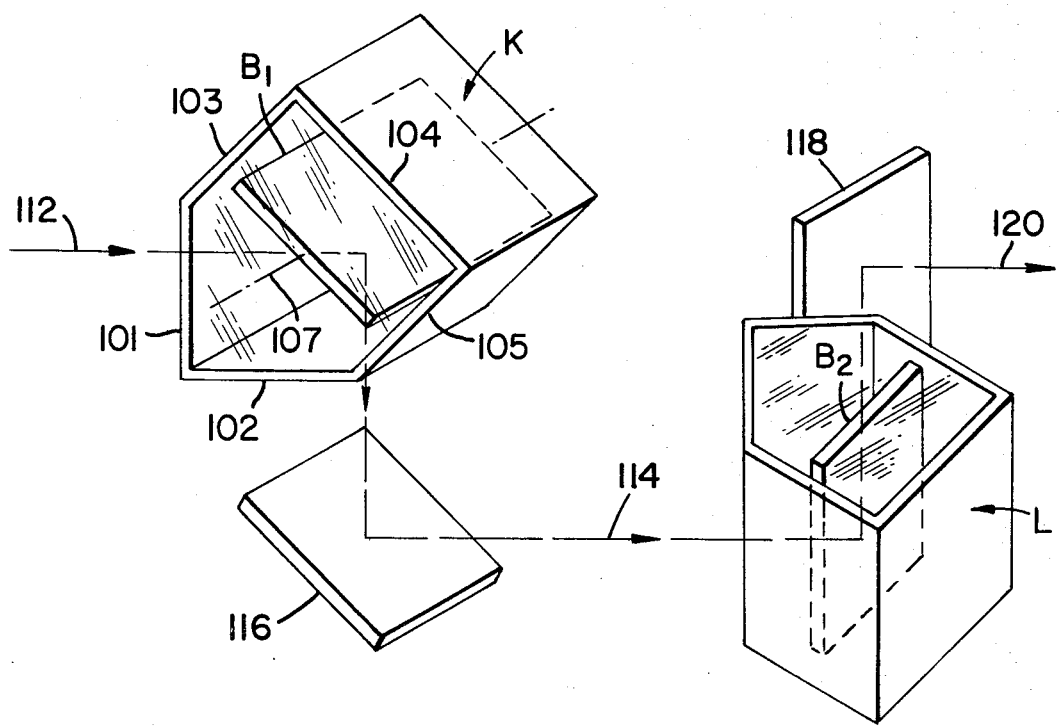
FIG_7
FIG_7

MIRROR STABILIZER HAVING SPACE REFERENCED MOTION

This invention relates to optical stabilizers for damping ambient vibrations from optical instruments such as hand held telescopes of high power. More particularly, the present invention relates to a hydrostatically supported mirror which is proportionally fluid coupled to a reference coordinate system or orientation in space during instrument vibration. The relationship between the placement of the stabilizer in the optical train, the power of the optical train, and the proportional couple of the mirror to space is disclosed.

It is already known to inertially stabilize a two-power optical train by placing a stabilized mirror between the objective lens and the imaging plane of an instrument. Moreover, such mirrors, typically supported in fluid filled chambers, remain stationary with respect to space when the instrument undergoes vibration or rapid angular movement (as distinguished from panning). (See my Pat. No. 3,532,409 entitled "Hydrostatically-Supported Optical Stabilizer" issued Oct. 10, 1970.)

An object of the present invention is to provide a space referenced couple through fluid between the mirror on one hand and the chamber sidewalls on the other hand so that the mirror undergoes a proportional movement with reference to space when the chamber is moved with reference to space.

An advantage of this invention is that the stabilizer can be used with optical instruments having a wide variety of design configurations.

An additional advantage of this invention is that where powers of greater than two are desired, a two-power imaging optical train followed by a higher powered viewing optical train is not required. The number of positive lenses used is thus reduced with resultant reduction of curvature of field and chromatic aberrations.

An additional object of this invention is to utilize the index of refraction of the mirror supporting fluid to obtain the desired angular reflection of the stabilized light.

An advantage of utilizing this index of refraction is that even in the case where the mirror remains stationary with respect to a point in space, the indexes of refraction can be used to increase the deflection generated by motion of the stabilizer mirror.

An additional object of this invention is to disclose a series of mirror and chamber configurations where the resultant fluid couple will permit the stabilizer to be mounted at locations off of the midpoint between an objective lens and imaging point along an optical train.

An advantage of this controllable fluid couple is that the stabilizer can be located to complement the design of the optical path. Optical path dimensioning relative to the location of the stabilizer is no longer required.

A further object of this invention is to disclose a mirror and chamber couple where the mirror moves at a rate proportional and opposite to the angular vibrational rate of the chamber with respect to an orientation in space. This can be achieved by constructing a chamber with an elongate section normal to the plane of the mirror.

An advantage of this optical design is that the mirror can be placed relatively close to the focal plane or eyepiece of the stabilized instrument.

A further object of this invention is to provide a mirror and chamber couple where the mirror moves at a rate measured with respect to the chamber that is of the same sense and less than the angular vibrational rate of the chamber with respect to an orientation in space. This can be achieved by constructing the chamber with an elongate section parallel to the plane of the mirror.

An advantage of this configuration is that the mirror can be placed in a position adjacent the objective lens. In this location, small mirror movement produces large corresponding image stabilizing movement.

A further advantage of this chamber construction is that the small mirror movement giving large corresponding image stabilizing movement produces less inclination of the image plane with resultant reductions in distortion during instrument image stabilization.

A further object of this invention is to athermalize the focal length of the optical path between the objective and imaging plane. Accordingly, a small positive lens of fluid is provided.

An advantage of this fluid lens construction is that where thermal changes in the index of refraction of the mirror supporting fluid occurs, the fluid lens produces complementary changes stabilizing the position of the image plane with respect to the chamber and objective.

A further advantage of this invention is that the couple between the chamber on one hand and the mirror on the other hand will permit numerous chamber configurations, which configurations can be other than spherical and can be changed to accommodate many preselected optical housings.

Another advantage of this invention is that the chamber does not have a fluid lens which participates in the overall magnifying effect of the optical train.

An advantage of the absense of such an overall magnifying fluid lens is that the index of refraction of the fluid chosen is not critical.

A further advantage of the absence of a fluid lens is that the color dispersion of a fluid chosen is not critical. Hence a much wider range of fluids can be used for the supporting bath of this invention.

Other objects, features and advantages of this invention will be more apparent after referring to the following specification and attached drawings in which:

FIG. 1 is a perspective schematic view of a stabilized telescope in which the fluid coupled stabilizer of this invention is located optically adjacent the objective;

FIG. 2 is an enlarged sectional view of the stabilizer of this invention before vibrational motion;

FIG. 3 is an enlarged sectional view of the stabilizer of this invention during vibrational motion;

FIG. 4 is a perspective schematic view of a stabilized telescope in which the fluid coupled stabilizer of this invention is located optically adjacent the imaging plane or eyepiece;

FIG. 5 is an enlarged sectional view of the stabilizer of FIG. 4 before vibrational motion;

FIG. 6 is an enlarged sectional view of the stabilizer of FIG. 4 during vibrational motion; and, FIG. 7 is a stabilizer comprising two stabilizer elements placed in an optical train for stabilization along mutually orthogonal axes in accordance with the principals of this invention.

With reference to FIG. 1, the stabilizer of this invention is illustrated mounted within a 20-power optical train. Typically, an objective A is mounted to converge light onto stabilized mirror B within chamber C. The stabilized light is retrodirected from mirror B onto inverting mirrors D where the light is subsequently imaged at plane E and viewed through eyepiece F. For convenience a negative lens 14 may be placed in the optical path to extend its focal length.

The telescope comprising lenses A, 14 and F is well understood in the art. Without the mirrors B and D this telescope would invert the images received in both their horizontal and vertical parity. Mirror B functions to fold the light path from lens A backwardly and upon itself. Mirrors D serve to displace this light so that it may be conveniently viewed off the optical path between objective A and stabilized mirror B.

In addition to displacing light, mirrors D serve to reinvert the light so that the image as viewed has the same parity as the real world image which is being magnified. Typically, mirror 16 deflects the light path downwardly at right angles to the optical axis 20 between objective A and stabilized mirror B. Roof mirrors 18 and 19 retrodirect the light along an optical axis 22 to its imaging plane E. Mirrors 16 on the one hand and 18 and 19 on the other hand serve to provide vertical reinversion of the image. Likewise, roof mirrors 18 and 19 serve to provide horizontal reinversion of the image. Magnified image parity to real world image parity results.

Several important observations about the optical path of the telescope of FIG. 1 can be made. First, mirror 16 will cause a partial blocking of the converging light to image plane E. This effect, however, is not critical where the image is either imaged at a plane E for non-viewing purposes such as camera applications, or alternately where the pupil obstruction caused by mirror 16 at the end of the optical train has a size substantially smaller than the pupil of the human eye.

Additionally, it will be noted that the stabilizer is located at a distance of approximately ⅓ of the focal length, measured from the objective towards the focal plane of the objective. Placement of the stabilizer adjacent the objective enables small mirror movement to produce large corresponding stabilized image movement. This results in less inclination of the image plane E relative to the objective A during stabilizing motion. Further, and as will more fully hereinafter appear, mirror B moves relative to chamber C at a rate which is less than the angular inclination of the chamber.

Referring to FIGS. 2 and 3, the construction and operation of the stabilizer of this invention can be understood. Chamber C is typically cylindrical having cylindrical sidewalls 25 closed at one end by an opaque disk shaped wall 27 and closed at the other end by a transparent disk shaped window 28.

Chamber C is filled with fluid. One fluid which can be used is a transparent fluorocarbon chemical sold under the trademark "FC 48" a product of the Minnesota Mining & Manufacturing Company. This liquid has a density 1.9 times that of water, and an index of refraction of 1.3. Typically, the chamber can be provided with bellows, a balloon or alternately a bubble trap to avoid problems of accumulated gasses in the fluid within the chamber.

Mirror B is typically disk shaped and has an outer diameter which is less than the inside diameter of chamber C. As here illustrated, mirror B is surrounded by cylindrical walls 33 which assist the fluid coupling between chamber C and the mirror B.

Several important observations about the fluid coupling between the mirror B on one hand and the chamber C on the other hand can be made. First, it will be noted that chamber C has a ratio wherein the diameter exceeds the distance between the two disc shaped end walls. This ratio wherein the diameter exceeds the distance between the two disc shaped end walls results in mirror movement which is a fraction of the case movement (see FIG. 3).

Secondly, the couple between the fluid and casing C is here effected primarily by the hydrostatic pressures which can develop in the vicinity of the right angles between the disks 27 and disk shaped window 28 and the cylindrical sidewalls 25. It will be apparent to those skilled in fluid art that skin friction between the fluid and the sidewalls of the casing also effects this fluid couple.

Likewise, the couple between the fluid and mirror B will occur through contact of the fluid on both sides of mirror B and with cylindrical sidewalls 33. This couple additionally will be modified by the skin frictions between the fluid and mirror assembly.

It should immediately be apparent that the fluid couple between the chamber C on one hand and the mirror B on the other hand can be accomplished in numerous ways. For example, the walls of chamber C could be provided with baffles, screens, and the like so that the chamber sidewalls when angularly moved couple to the fluid in varying degrees through pressure effects and shear effects. Likewise, the couple between the mirror B and the fluid can be effected in many ways. For example, the mirror or its cylindrical sidewalls 33 can be perforated, provided with baffles, have screens mounted thereto, or the like.

Additionally, the viscosity and density of the particular fluid used to support mirror B within the fluid will also be a factor. Thus, it will be seen that by the selection of chamber shape and configuration, mirror shape and configuration and supporting fluid viscosity and density the couple between the mirror B and chamber C can be varied.

Mirror B is typically supported on an elastic or tensioned thread 37 attached and extended axially of chamber C. The thread 37 here used is sold under the trademark ELASTEX, a registered trademark of David Traum, Inc. of New York. This elastic with thread coating removed is a rubber compound which has heat and chemical resistant properties and is inert with respect to the fluid 30.

Mirror B at the central portion of its disk is pierced normally by a fastened tube 40. Tube 40 in turn is fastened to elastic 37 midway between disk shaped and wall 27 and disk shaped window 28. Supportive cylinders 41 and 42 enclose the elastic to further position the mirror and arrest mirror sag when thermal fluid density changes occur.

Referring briefly to FIG. 3, the function of tube 40 can be immediately understood. When mirror B is tilted an angle $\theta$ with respect to chamber C, as illustrated in FIG. 3, tube 40 stretches elastic 37. The elastic as stretched applies a small bias or correcting force to mirror B tending to return it to its original alignment to disk shaped window 28. When the optical instrument is panned, the restoring force exerted by elastic 37 and tube 40 on mirror B enables the mirror to move in the direction of an object being viewed. The fluid provides a lossy coupling damping out oscillation of the mirror on the elastic. The lossy coupling provided by the fluid is capable of damping out unwanted modes of oscillation of the mirror and has little effect on the desired modes of oscillation of the mirror.

It will be noted that mirror B at its point of attachment is preferably fixed to elastic 37 midway between disk shaped wall 27 and disk shaped window 28. This positioning of the mirror on the elastic prevents the mirror from being translated at tube 40 along the window 28 during angular motion of the chamber C.

Several observations about the construction of mirror B and its attached sidewall 33 can be made. First, the mirror is constructed with an overall density which is the same as that of the supporting fluid. The weight of the mirror is thus equal and opposite to the floatation of the mirror which thereby largely nullifies the effect of gravity for the mirror assembly.

Additionally, both the center of floatation and center of gravity of the mirror are located coincident with the center of tube 40 mounted to the mirror. This concentricity of the center of gravity and center of floatation prevents floatation forces from being exerted on the mirror which might cause its angular displacement with respect to the case, particularly when the density of the fluid changes with temperature variations.

Referring to FIG. 2 the reflection of light from mirror B can be illustrated. In FIG. 2 an incident light ray 45 is shown passing normal to the surface of mirror B. The light passes through disk shaped window 28 onto the surface of mirror B where it is reflected. When reflected as reflected ray 55, the light is retrodirected along its original path. Since the light is here shown substantially normal to window 28 and mirror B, no appreciable angular deflection due to refraction or reflection is present.

Referring to FIG. 3, it will be seen that chamber C has been angularly deflected by an angle $\Phi$. As the chamber is fixed to the stabilized optic instrument, angle $\Phi$ will be equal to the angular vibrational movement of the chamber.

Because of the particular fluid couple between the chamber C and mirror B, mirror B has moved to a new angular orientation $\theta$ with respect to chamber C. This angular orientation $\theta$ will result in the angle between the incident ray and the reflected ray being altered by an amount of $2n\theta$ from the case where the mirror would be rigidly attached to the chamber where $n$ is the refraction of the fluid in the chamber.

If the mirror had moved with the chamber, a difference in the angle of incidence and reflection would have occurred equal to $2\Phi$. However, mirror movement and fluid index of refraction $n$ have changed this by $2n\theta$. Hence, the difference between the angle of incidence and the angle of reflection will be $2n\theta - 2\Phi$ as shown on FIG. 3.

Having set forth the relationship between the incident and reflected rays on the mirror or stabilizer, the relationship of the remainder of the optics of this invention can be easily understood. Typically, the stabilizer is placed in the optical instrument of this invention to satisfy the equation:

$$2n\theta \times D_I = \Phi \times F_1$$

where $D_I$ is the distance between the stabilizer and the focal point of the optical system being stabilized, and $F_1$ is the focal length of the optical system being stabilized. It should be noted that optics following the mirror B and towards the image plane will not affect these values.

Analysis of the above equation will immediately indicate that all of the equation variables will be known for a particular design save and except for the desired function of $\theta$, that is the angle multiplier produced between the motion of the case on one hand and the motion of the mirror on the other hand. In the case of the mirror and fluid of the preferred embodiment of the 20-power optical instrument illustrated in FIGS. 1–3 where the mirror is located at a distance of ⅓ between the objective and its focus, the desired fluid couple multiplier $\theta$ will be 0.577 for $n = 1.3$.

It should be appreciated that the equation set forth above is for camera stabilization. It should be understood, to anyone having ordinary skill in the art that with a modification of:

$$2n\theta \times D_I = (\Phi \times F_1) \times (1 \pm 1/m)$$

to the above equation, eye stabilization can be achieved. In the above equation M is the overall magnification of the optical train. Such a modification is disclosed in U.S. Pat. No. 3,473,861, issued Oct. 21, 1969, entitled "Accidental Motion Compensation for Optical Devices."

Further, it should be noted that the stabilizer can be located in front of the objective. While this is not always desirable, it is a possible embodiment of this invention.

It should be understood that the mirror B used with this invention can be other than flat. For instance, the mirror shown in FIGS. 1–3 could be dished as in a catadioptric optical system. Dishing of the mirror would merely effect the focal length $F_1$ of the objective system; all other parameters of the above equation would remain unchanged.

Having set forth the relation between the incident and reflective light rays, and the relation of the stabilizer to the optical path, it will now be convenient to discuss the athermalization of the optical path of this invention.

It is known that the indexes of refraction of the fluid 30 will vary with respect to the temperature of the fluid bath. Referring to FIGS. 1 and 3 where the temperature of the fluid increases the index of refraction will decrease. Conversely where the temperature decreases the index of refraction will increase.

In the example of FIG. 1 when the temperature drops, imaging plane E will move away from objective A and mirror B. This is caused by the increased bending of the reflected converging rays toward a parallel disposition to the optical axis. Conversely when the temperature increases imaging plane E will move towards objective A. This is caused by the decreased bending of the converging rays towards a parallel disposition to the optical axis.

Movement of the imaging plane E could be extremely undesirable. Where a hand held optical instrument was used on a cold day, the heat from the viewer's hand could change the effective focal length of the instrument. These changes in focal length would modify the function of the couple between the chamber on one hand and the mirror on the other hand. Optimum stabilization would not be possible. Additionally, continual adjustment of the eyepiece to view an image would be required. All this can be avoided by the athermalization of the optics as illustrated in FIG. 2.

Referring to FIG. 2, it will be seen that disk shaped window 28 at inner surface 60 is provided with a small concavity. This concavity produces a positive lens in the fluid bath 30. Typically, this fluid lens is not of such a power to appreciably affect the overall magnification of the optical train. Rather, this lens typically in the range of less than one tenth of a dioptor merely serves to place an optical correction between the incident ray 45 and the reflected ray 55 which is equal and opposite to that which would be produced by the change in the index of refraction of the liquid layer alone. Thus, where the temperature increases and the focal plane moves towards the objective, there will result at the positive fluid lens a decreasing convergence. This decreasing convergence will oppose the image plane movement and result in the image plane remaining the same distance from the stabilizer.

Conversely where the temperature decreases and the focal plane moves away from the objective, there will result at the positive fluid lens an increasing convergence. This increasing convergence will also oppose the image plane movement and result in the image plane remaining the same distance to the stabilizer.

The interface between the positive fluid lens on one hand and the chamber side of the disk shaped window 28 on the other hand has an additional advantage not immediately apparent. Typically, some light will be reflected at this interface rather than passing through window 28 and the fluid 30 of the bath onto the mirror. This reflected light can interfere with the image ultimately produced and viewed. The concave surface provided at the fluid glass interface causes dispersion of this light. Accordingly, this reflected light reaches the vicinity of the image in a more dispersed or defocused form. Consequently viewing is improved.

It should be noted in passing that the outside surface of window 28 can be given a small lens surface, typically positive. This lens surface is designed to counteract the chromatic dispersion of the positive fluid lens.

Referring to FIG. 4 an alternate embodiment of this invention is illustrated. A folded light path having an objective A, a mirror B, a chamber C', inverting mirrors D, focal plane E and objective F is illustrated. It will be noted in this case, however, that mirror B is placed ⅔ of the distance from objective A to focal plane E. This placement of the mirror B at ⅔ of the focal distance requires a differing chamber configuration as illustrated in FIGS. 5 and 6.

Referring to FIG. 5, the construction of mirror B, elastic 37 and tube 40 is identical to that construction previously illustrated. As distinguished from the construction previously illustrated it will be noted that chamber C' is elongate normal to the plane of mirror B along the axis of its cylinder. Tubes 41 and 42 have been omitted.

This changes the fluid couple between the mirror B and the chamber C' as illustrated in FIG. 6. Referring to FIG. 6, it will be noted when chamber C' is tilted an angle $\Phi$, mirror B tilts with respect to chamber C' an angle $\theta$. This angle $\theta$ is in the opposite direction to the angle $\Phi$ and the angle $\theta$ exceeds angle $\Phi$. Mirror movement with respect to a given orientation in space appears to be in a reverse direction from the movement of chamber C'.

Referring back to FIG. 4, as well as the equation previously illustrated, it will be realized that this type of chamber is best used where it is desired to locate the stabilizer of this invention adjacent the focal plane E of the stabilized instrument. Using the preferred embodiments of fluid and focal lengths illustrated in FIG. 4, it will be seen that mirror B must be tilted at a rate approximately 1.15 times that of the tilt of casings C' for an index of refraction of $n = 1.3$.

It should be apparent that the stabilizer of this invention can be used with any number of configurations.

The embodiments of this stabilizer illustrated in FIG. 1–6 have all included two degrees of motion. That is to say, stabilization has been effected at the single stabilizer in components which are orthogonal to the main optical path of this invention. It should be realized that the stabilizing effect of this invention can be achieved by using two mirrors each given one degree of motion relative to mutually orthogonal axes. Such an embodiment is illustrated in FIG. 8.

Referring to FIG. 7, a mirror $B_1$ is shown supported within a chamber K. Chamber K includes a first window 101 and a second normal window 102 here shown normal to window 101 which together form a roof-like configuration over opaque chamber walls 103, 104, and 105. Typically, the chamber ends are closed by opaque walls (not shown) to both contain fluid within the chamber and to provide a pivot point for the mirror $B_1$ which is mounted within the chamber.

Typically, mirror $B_1$ is pivoted about an axis 107 which is here parallel to the planes of the windows 101 and 102. The mirror, as pivoted about this axis, is biased in a neutral position which is here inclined at an angle of 45° with respect to both windows 101 and 102. It should be realized, that by adjustment of the shape and configuration of chamber K relative to the shape and configuration of mirror $B_1$ a desired fluid couple in one orthogonal axis relative to the optical path can be produced.

Light 112 typically will be incident upon mirror $B_1$ through window 101 and will exit the stabilizer chamber K at window 102. The light then will be reflected to a path 114 which is perpendicular to the pivot axis of mirror $B_1$ and the incoming light 112 to mirror $B_1$. Further reflection will occur by means of mirror 116 positioned along the optical path. Light passing along path 114 and into chamber L will impinge upon a stabilized mirror $B_2$ pivotal along axis orthogonal to the axis of mirror $B_1$ and thereafter exit the chamber along path 120. As exiting chamber L along path 120 and reflecting from mirror 118, the light will be completely stabilized.

It should be realized that the configuration of chamber L and the configuration of its mirror $B_2$ will generally be different from the configuration of chamber K and its mirror B₁. This difference in construction will be designed to slightly alter the fluid couple between the mirror and chamber to make adjustment for the distance between each stabilizer and the imaging plane of the optical path.

The stabilizer embodiment illustrated in FIG. 7 additionally has advantages which may not immediately be apparent. For example, it will be observed that paired optical paths could impinge upon both mirrors $B_1$ and mirrors $B_2$ at spaced apart locations. Such paired optical paths, if of the same focal lengths, and of the same distance from their respective imaging planes could have exact duplicate stabilizing effects applied to them. Thus, with the configuration shown in FIG. 7, the stabilization of paired optical paths for binoculars and the like can be possible.

It will be apparent to those skilled in the art that numerous changes in the embodiments of this invention can be made. For example, the chamber will admit of literally an infinite number of configurations so long as a proportional couple between the mirror and chamber is maintained. Likewise, both the mirror configuration and biased mounting of the mirror can be altered. Bias of the mirror for example could be made by magnets. Likewise many other modifications of this disclosure can be made without departing from the spirit of this invention.

What is claimed is:

1. An optical instrument for stabilizing an image when said optical instrument is subjected to angular vibrational orientation, said optical instrument comprising: an objective lens having an optical path terminating at an imaging plane; a mirror disposed within said optical path for receiving incident rays from said objective and directing reflected rays to said imaging plane; a fluid tight chamber about said mirror and attached to said instrument; a transparent fluid surrounding and at least partially supporting said mirror and contained within said chamber; a transparent portion in said chamber in said optical path; means biasing said mirror to a neutral reflecting position with respect to said optical path; and coupling means including a surface movable with said chamber and a surface movable with said mirror for coupling said mirror to said chamber through said fluid to act on said biasing means through said mirror and also to act on the inertia of said fluid and mirror; said surface movable with said chamber acting upon and moving said fluid; and said surface movable with said mirror being movable in response to said movement of said fluid to produce changing angular orientation of said mirror with respect to space at a rate proportional to but different from the vibrational angular orientation of the instrument with respect to space.

2. The invention of claim 1 and wherein said fluid neutrally bouyantly supports said mirror.

3. The invention of claim 1 and wherein said imaging plane is within said instrument.

4. The invention of claim 1 and wherein said chamber is cylindrical and contained within said instrument.

5. The invention of claim 4 and wherein said cylindrical chamber is closed by a wall at either end to contain said fluid.

6. An optical stabilizer for use in combination with an optical instrument for stabilizing vibrational angular orientations including: a fluid tight chamber; a mirror within said chamber; said chamber having a transparent portion in a wall of said chamber; means for biasing said mirror to a preselected neutral position in said chamber for reflecting incident light through said transparent portion; a transparent fluid interior of said chamber and surrounding said mirror to at least partially bouyantly support said mirror; and, coupling means including a surface movable with said chamber and a surface movable with said mirror for coupling said mirror to said chamber through said fluid to act on said biasing means through said mirror and also to act on the inertia of said fluid and mirror; said chamber surface acting upon and moving said fluid; and said surface on said mirror being movable in response to said movement of said fluid to produce space referenced angular orientation of said mirror at a rate proportional to but different from the vibrational angular orientation of the instrument.

7. The optical stabilizer of claim 6 and wherein said chamber includes a second transparent portion in a wall of said chamber and said neutral position of said mirror is chosen to receive incident light through said second transparent portion and to direct reflected light through said first transparent portion.

8. The optical stabilizer of claim 6 and wherein said mirror is pivotally mounted in said chamber for rotation about an axis.

9. The optical stabilizer of claim 6 and wherein said biasing means includes an elastic member affixed to a wall of said chamber at one portion and affixed to said mirror at another portion.

10. An optical stabilizer for use in combination with an optical instrument for stabilizing vibrational angular orientations including: a fluid-tight chamber having cylindrical sidewalls and two end walls; a mirror within said chamber having a cross section less than the cross section of said cylindrical sidewalls; said chamber having a transparent portion defined through one of said end walls of said chamber; means for biasing a reflecting surface of said mirror to a preselected neutral position towards said transparent portion defined through one of said end walls of said chamber for reflecting incident light upon said mirror through said transparent portion; a transparent fluid interior of said chamber and surrounding said mirror to at least partially support said mirror; and coupling means including a surface movable with said stabilizer and a surface movable with said mirror for coupling said mirror to said stabilizer through said fluid to act on said biasing means through said mirror and also to act on the inertia of said fluid and mirror; said stabilizer surface acting upon and moving said fluid; and said surface on said mirror being movable in response to said movement of said fluid to produce changing angular orientation of said mirror with respect to space at a rate proportional to but different from the vibrational angular orientation of the stabilizer with respect to space.

11. The invention of claim 10 wherein the distance between the end walls of said chamber is less than the diameter of said cylindrical sidewalls.

12. The invention of claim 10 and wherein the distance between the end walls of said chamber is greater than the diameter of the cylindrical sidewalls of said chamber.

13. The invention of claim 10 and wherein said biasing means includes an elastic member extending from one of said two end walls of said chamber and means for affixing said mirror to said elastic member.

* * * * *